(12) United States Patent
Crawford et al.

(10) Patent No.: US 12,304,797 B2
(45) Date of Patent: May 20, 2025

(54) MOBILE PRODUCT DISPENSER

(71) Applicant: PepsiCo, Inc., Purchase, NY (US)

(72) Inventors: Robert Crawford, Yorktown Heights, NY (US); Cheuk Chi Lau, White Plains, NY (US)

(73) Assignee: PepsiCo, Inc., Purchase, NY (US)

( * ) Notice: Subject to any disclaimer, the term of this patent is extended or adjusted under 35 U.S.C. 154(b) by 30 days.

(21) Appl. No.: 16/691,883

(22) Filed: Nov. 22, 2019

(65) Prior Publication Data
US 2021/0155465 A1 May 27, 2021

(51) Int. Cl.
*B67D 1/00* (2006.01)
*B67D 1/08* (2006.01)
*H04L 12/28* (2006.01)

(52) U.S. Cl.
CPC ......... *B67D 1/0021* (2013.01); *B67D 1/0891* (2013.01); *B67D 2210/00136* (2013.01); *H04L 12/2816* (2013.01); *H04L 12/2823* (2013.01)

(58) Field of Classification Search
CPC .......... B67D 2210/00133; B67D 2210/00136; B67D 1/0021; B67D 1/0891; B67D 1/0005; B67D 1/0022; H04L 12/2816; H04L 12/2823; H04L 2012/285
USPC ........................................... 99/280; 141/231
See application file for complete search history.

(56) References Cited

U.S. PATENT DOCUMENTS

| | | | | |
|---|---|---|---|---|
| 2,462,019 A | * | 2/1949 | Bowman | B67D 1/0036 222/1 |
| 4,163,510 A | * | 8/1979 | Strenger | G01F 11/28 222/129.2 |
| 4,903,862 A | * | 2/1990 | Shannon | B67D 1/0009 222/108 |

(Continued)

FOREIGN PATENT DOCUMENTS

| | | |
|---|---|---|
| CN | 107274082 A | 10/2017 |
| CN | 107825435 A | 3/2018 |

(Continued)

OTHER PUBLICATIONS

International Search Report and Written Opinion of the International Searching Authority in International Application No. PCT/US2020/060234, mailed Feb. 8, 2021 (14 pages).

(Continued)

*Primary Examiner* — David Colon-Morales
*Assistant Examiner* — Stephanie A Shrieves
(74) *Attorney, Agent, or Firm* — Sterne, Kessler, Goldstein & Fox P.L.L.C.

(57) ABSTRACT

Mobile product dispensers for storing and dispensing products to consumers at various locations. A mobile product dispensers may include a product dispensing system, a user interface, a powertrain system, and a control unit. The mobile product dispenser may freely roam or follow a predetermined path within its environment of operation, and may engage with and service consumers along its route. A consumer may also summon the mobile product dispenser to a location using a user device such as a smartphone, smart- (Continued)

watch, or the like. The control unit may enable the mobile product dispenser to autonomously travel within its environment of operation and/or to navigate to the location of a consumer.

18 Claims, 9 Drawing Sheets

(56) References Cited

U.S. PATENT DOCUMENTS

| | | | | |
|---|---|---|---|---|
| 5,644,972 | A * | 7/1997 | Dahmen | A47J 31/007 99/290 |
| 5,730,324 | A * | 3/1998 | Shannon | B67D 1/0021 222/64 |
| 5,964,258 | A * | 10/1999 | Schoenbauer | B60P 3/228 141/83 |
| 7,757,896 | B2 * | 7/2010 | Carpenter | G07F 13/065 222/129.4 |
| 8,863,649 | B1 * | 10/2014 | Rao | A47J 31/00 700/15 |
| 9,406,187 | B2 | 8/2016 | Hammonds et al. | |
| 9,741,010 | B1 | 8/2017 | Heinla | |
| 9,758,363 | B2 * | 9/2017 | Sayers | B67D 7/0294 |
| 10,248,122 | B2 | 4/2019 | Cronin et al. | |
| 10,275,975 | B2 | 4/2019 | High et al. | |
| 10,325,440 | B2 | 6/2019 | Abdelmalak et al. | |
| 10,328,769 | B2 | 6/2019 | Ferguson et al. | |
| 10,611,622 | B2 | 4/2020 | Kline et al. | |
| 10,854,033 | B2 | 12/2020 | Jafa et al. | |
| 11,208,315 | B2 * | 12/2021 | Crawford | B67D 1/0888 |
| 2004/0019406 | A1 | 1/2004 | Wang et al. | |
| 2005/0228692 | A1 * | 10/2005 | Hodgdon | G16H 50/30 705/2 |
| 2010/0100241 | A1 | 4/2010 | Jarisch et al. | |
| 2010/0125362 | A1 | 5/2010 | Canora et al. | |
| 2011/0160948 | A1 * | 6/2011 | Bailey | G05D 1/0259 701/23 |
| 2012/0035761 | A1 * | 2/2012 | Tilton | B67D 1/0057 700/239 |
| 2013/0027227 | A1 | 1/2013 | Nordstrom | |
| 2013/0054010 | A1 | 2/2013 | Holman et al. | |
| 2013/0096715 | A1 | 4/2013 | Chung et al. | |
| 2014/0034673 | A1 | 2/2014 | Hoover | |
| 2014/0110018 | A1 * | 4/2014 | Scarvelli | B67D 1/0891 141/64 |
| 2014/0136414 | A1 | 5/2014 | Abhyanker | |
| 2014/0209634 | A1 * | 7/2014 | Metropulos | B67D 1/06 222/129.1 |
| 2014/0316561 | A1 | 10/2014 | Tkachenko et al. | |
| 2015/0012163 | A1 * | 1/2015 | Crawley | G05D 1/0248 701/23 |
| 2015/0144652 | A1 * | 5/2015 | Kline | B67D 1/0888 222/23 |
| 2015/0144653 | A1 * | 5/2015 | Kline | G07F 9/001 222/23 |
| 2015/0158712 | A1 * | 6/2015 | Jersey | B67D 1/0857 222/129.4 |
| 2015/0183627 | A1 * | 7/2015 | Tansey, Jr. | B67D 1/0078 222/190 |
| 2015/0245734 | A1 | 9/2015 | Vogelsang et al. | |
| 2015/0254404 | A1 * | 9/2015 | Ko | G16H 40/20 705/2 |
| 2016/0090288 | A1 | 3/2016 | Givens, Jr. et al. | |
| 2016/0098882 | A1 | 4/2016 | Holdych et al. | |
| 2016/0159632 | A1 * | 6/2016 | Wheatley | B67D 1/0882 222/129 |
| 2017/0001849 | A1 * | 1/2017 | Carpenter | B67D 1/0032 |
| 2017/0011580 | A1 * | 1/2017 | Huang | G06Q 20/20 |
| 2017/0253473 | A1 * | 9/2017 | Melville, Jr. | B67D 1/0888 |
| 2017/0255921 | A1 | 9/2017 | Zhang | |
| 2018/0053369 | A1 | 2/2018 | High et al. | |
| 2018/0056843 | A1 * | 3/2018 | Michalski | B62B 5/0036 |
| 2018/0132507 | A1 | 5/2018 | Siegel et al. | |
| 2019/0049988 | A1 * | 2/2019 | Meij | G05D 1/0274 |
| 2019/0054876 | A1 | 2/2019 | Ferguson et al. | |
| 2019/0056751 | A1 * | 2/2019 | Ferguson | G06K 9/00201 |
| 2019/0071298 | A1 * | 3/2019 | Tomforde | G06K 7/1417 |
| 2019/0279457 | A1 * | 9/2019 | Hoyt | G07F 9/10 |
| 2019/0300357 | A1 | 10/2019 | Crawford et al. | |
| 2019/0330043 | A1 | 10/2019 | Carpenter et al. | |
| 2020/0105085 | A1 * | 4/2020 | Jafa | G08G 1/202 |
| 2020/0122994 | A1 * | 4/2020 | Cimatti | G06Q 20/3821 |

FOREIGN PATENT DOCUMENTS

| | | |
|---|---|---|
| CN | 107877520 A | 4/2018 |
| CN | 108171875 A | 6/2018 |
| EP | 2759990 A1 | 7/2014 |
| JP | S5445817 A | 4/1979 |
| JP | 2002104591 A | 4/2002 |
| JP | 2013500209 A | 1/2013 |
| JP | 2019144908 A | 8/2019 |
| WO | 2008075346 A2 | 6/2008 |
| WO | 2014176000 A1 | 10/2014 |
| WO | 2017143402 A1 | 8/2017 |

OTHER PUBLICATIONS

Extended European Search Report issued in European Application No. 19867062.2, mailed May 23, 2022, 3 pages.

Extended European Search Report in European Patent Application No. 20890099.3, mailed Nov. 17, 2023, (9 pages).

* cited by examiner

MOBILE PRODUCT DISPENSER

FIELD

The described embodiments generally relate to mobile product dispensers, such as mobile beverage dispensers. In particular, embodiments relate to autonomous mobile product dispensers that may be summoned to a location by a user to dispense a product (e.g., a fountain drink) to the user.

BACKGROUND

Product dispensers, such as soda fountains, may enable consumers to select from and dispense a variety of beverages or other consumable goods on demand. Some product dispensers are self-service and do not require the presence of an employee to dispense a product, thereby lowering operating costs. Further, some product dispensers may enable consumers to select from and dispense a variety of different products in one convenient location.

BRIEF SUMMARY

Some embodiments provide mobile product dispensers that may operate autonomously and may navigate to users to dispense products. They may allow a user to conveniently summon the mobile product dispenser to the location of the user or another predetermined location using, for example, a user mobile device. Methods of dispensing a product from a mobile product dispenser are also described herein.

For example, embodiments include a mobile product dispenser, which may include a product-dispensing system. The product-dispensing system may include a first product-ingredient chamber, and a second product-ingredient chamber. The product-dispensing system may also include a product dispenser and a control unit. The control unit may be configured to allow the mobile product dispenser to automatically move to the location of a user. In some embodiments, a first product ingredient may be disposed within the first product-ingredient chamber, and a second product ingredient may be disposed within the second product-ingredient chamber. The first and second product ingredients may be mixed together and dispensed to a user at the location of the user, and the ratio of the first product ingredient to the second product ingredient in a dispensed beverage may be at least 5:1.

Embodiments also include an autonomous mobile product-dispensing system, which may include a mobile product dispenser. The product-dispensing system may include a first product-ingredient chamber, and a second product-ingredient chamber. The product-dispensing system may also include a control unit, and the control unit may be configured to allow the mobile product dispenser to move autonomously. In some embodiments, a first product ingredient may be disposed within the first product-ingredient chamber, and a second product ingredient may be disposed within the second product-ingredient chamber. The autonomous mobile product-dispensing system may also include a plurality of summoning devices configured to communicate with the mobile product dispenser. In some embodiments, the mobile product dispenser may be configured to autonomously navigate to the location of a user when summoned by a summoning device. In some embodiments, the first and second product ingredients may be mixed together and dispensed to a user at the location of the user.

Embodiments also include a product-dispensing system, which may include a mobile product dispenser. The mobile product dispenser may include a first product-ingredient chamber and a second product-ingredient chamber. In some embodiments, a first product ingredient may be disposed within the first product-ingredient chamber, and a second product ingredient may be disposed within the second product-ingredient chamber. The mobile product dispenser may also include a control unit. The control unit may be configured to allow the mobile product dispenser to automatically move to the location of a user. The product-dispensing system may also include a point-of-sale system for processing transactions. In some embodiments, the mobile product dispenser may be in communication with the point-of-sale system, and the cost of a dispensed product may be automatically charged to a user using the point-of-sale system.

BRIEF DESCRIPTION OF THE FIGURES

The accompanying drawings, which are incorporated herein and form part of the specification, illustrate embodiments and, together with the description, further serve to explain the principles of the embodiments and to enable a person skilled in the relevant art(s) to make and use the embodiments.

DETAILED DESCRIPTION

Figure 1:
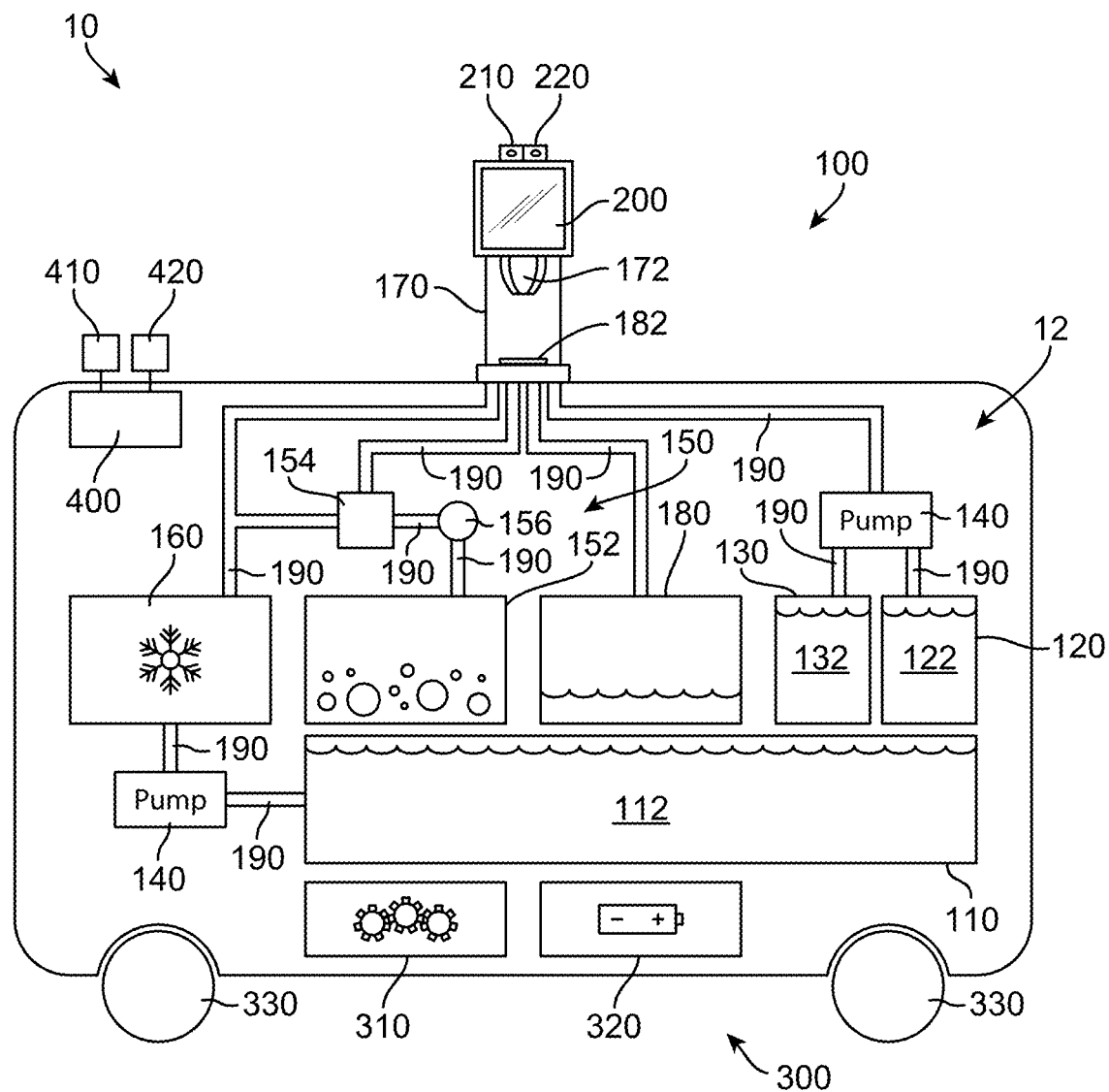
FIG. 1 is a partial sectional view of a mobile product dispenser according to some embodiments.

Embodiments of the present disclosure are described in detail with reference to embodiments thereof as illustrated in the accompanying drawings. References to "one embodiment," "an embodiment," "some embodiments," "certain embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following examples are illustrative, but not limiting, of the present embodiments. Other suitable modifications and adaptations of the variety of conditions and parameters normally encountered in the field, and which would be apparent to those skilled in the art, are within the spirit and scope of the disclosure.

Mobile product dispensers as described herein may include a mobile product dispensing system that may be configured to store and/or dispense products to users at various locations. Some embodiments may provide convenience to consumers by allowing the consumer to remain stationary while the mobile product dispenser travels to a location to meet the consumer.

As discussed in further detail below, the product dispensing system may store (e.g., in separate storage chambers) two or more product ingredients that are combined to form a final product that may then be dispensed to a user. For example, in some embodiments, the product dispensing system stores a base liquid (e.g., water) and flavoring (e.g., concentrated syrup) that are mixed together and dispensed to a user as a final beverage product (e.g., a soft drink). In some embodiments, the product dispensing system may be or may include features of a soda fountain, for example.

Some mobile product dispensers as described herein may be configured to operate autonomously, without direct human intervention. Some mobile product dispensers may be configured to autonomously navigate through their environments of operation. Such an environment of operation may be for example, an office, restaurant, gym, building, campus, stadium, event venue, or the like. As described in further detail below, some mobile product dispensers may travel to users at various locations in order to dispense products to the user. In some embodiments, mobile product dispensers may freely roam within their environment of operation. In some embodiments, mobile product dispensers may follow predetermined paths, routes, or the like within their environment of operation. In some embodiments, mobile product dispensers may follow routes that are dynamically updated based on data, such as, for example, dispensing activity. In some embodiments, mobile product dispensers may be summoned to a particular location using, for example, a user mobile device (e.g., a smartphone), a wearable device (e.g., a smartwatch), or other summoning device.

Embodiments will now be described in more detail with reference to the figures. With reference to FIG. 1, for example, a mobile product dispenser 10 may include a product dispensing system 100, a user interface 200, a powertrain system 300, and a control unit 400.

As mentioned above, product dispensing system 100 may store (e.g., in separate storage chambers) two or more product ingredients that are combined to form a final product that may then be dispensed to a user. For example, in some embodiments, product dispensing system 100 includes a base liquid (e.g., water) and flavoring (e.g., concentrated syrup) that are mixed together and dispensed to a user as a final beverage product (e.g., a soft drink). Product dispensing system 100 may be or may include features of, for example, a drink dispenser, beverage dispenser, refreshment dispenser, soda dispenser, soda fountain, water dispenser, or the like.

As shown in FIG. 1, product dispensing system 100 may include a first ingredient chamber 110 for storing a first product ingredient 112, a second ingredient chamber 120 for storing a second product ingredient 122, and a third ingredient chamber 130 for storing a third product ingredient 132. Although product dispensing system 100 is shown in FIG. 1 to include three product ingredient chambers, product dispensing system 100 may include more than or less than three product ingredient chambers. For example, in some embodiments, product dispensing system 100 includes one, two, three, four, five, six or more product ingredient chambers.

In some embodiments, product ingredients 112, 122, 132 are beverage ingredients. In some embodiments, first product ingredient 112 is a liquid such as, for example, water, carbonated water, milk, juice, tonic water, club soda, or other beverage liquid. In some embodiments, first product ingredient 112 is a base liquid, diluent, or the like that may be mixed with other beverage ingredients to create a final beverage product that may be dispensed to a user.

In some embodiments, second product ingredient 122 is a flavoring, concentrated flavoring, or the like that may be mixed with first product ingredient 112 to form a final beverage product. Second product ingredient 122 may be, for example, a syrup, paste, powder, sugar, granule, juice concentrate, nutrient, vitamin, supplement, and/or other beverage additive. In some embodiments, third product ingredient 132 is a flavoring, concentrated flavoring, or the like that may be mixed with first product ingredient 112 to form a final beverage product. Third product ingredient 132 may be, for example, a syrup, paste, powder, sugar, granule, juice concentrate, nutrient, vitamin, supplement and/or other beverage additive.

As mentioned above, second and third product ingredients 112, 122 may include flavors and/or other ingredients. The liquid flavors/ingredients may be created by condensed liquids that pack the essence of a beverage and may also include other healthy ingredients and/or nutrients. The liquid flavors/ingredients may include a fruit and/or flavor base such as: plum, blueberry, mango, cherry, grape, kiwi, strawberry, lemon, lime, passion fruit, apple, melon, tangerine, raspberry, orange, pomegranate, pineapple, coconut, grapefruit, acai, watermelon, peach, or any combination thereof. Additionally, the liquid flavors/ingredients may include a functional ingredient that includes herbs and spices or vegetables such as: mint, black tea, green tea, red tea, white tea, celery, chamomile, hibiscus, lavender, carrot, cucumber, verba mate, coca extract, ginger, chlorophyll, aloe, cinnamon, ginseng, or any combination thereof. Additionally, the liquid flavors/ingredients may include a functional ingredient that includes minerals, vitamins, electrolytes, energy, calm, protein, fiber, antioxidants, sweeteners and other functional ingredients such as: calcium, sodium, potassium, bicarbonate, magnesium, caffeine, fiber, protein, taurine, ribose, omega 3, or any combination thereof. Additionally, without departing from the invention, the liquid flavors/ingredients may include any combination of fruit or flavor base, functional ingredients with herbs and spices or vegetables, or functional ingredients with minerals and/or vitamins.

In some embodiments, first and second product chambers 110, 120 may be or may be configured to receive a bag-in-box concentrate or a self-pressurized concentrate, such as a bag-on-valve concentrate source, for example, as described in U.S. Pat. No. 9,873,606, issued Jan. 23, 2018, which is incorporated herein by reference in its entirety. In some embodiments, first and second product chambers 110, 120 may be or may be configured to receive a non-pressurized bag-on-valve concentrate source.

In some embodiments, second product ingredient 122 is different (e.g., a different flavoring) than third product ingredient 132. Thus, the final beverage product formed by mixing first product ingredient 112 and second product ingredient 122 may be different than the final beverage product formed by mixing first product ingredient 112 and third product ingredient 132. In this manner, product dispensing system 100 may be configured to create and dispense several types of beverage products on demand. In some embodiments, some or all of products dispensed by product dispensing system 100 may be post-mix beverages, fountain beverages, or the like.

In some embodiments, product ingredient chambers 110, 120, 130 may be configured to store products that may be dispensed to users without first being mixed with other products or product ingredients, such as pre-made beverages. Such products may include, for example, water, soda, juice, coffee, tea, and/or other beverage.

In some embodiments, second and third product ingredients 122, 132 may be concentrated ingredients, which is to say that second and third product ingredients 122, 132 may be intended to be diluted by and/or mixed with a base liquid (e.g., first product ingredient 112) before being dispensed to and/or consumed by a user. As mentioned above, second and third product ingredients 122, 132 may be, for example, concentrated flavorings, syrups, sugars, granules, and/or other beverage additives that may be diluted by and/or mixed with first product ingredient 112 to form a final beverage product. As described in further detail below, in some embodiments, second and third product ingredients 122, 132 may be highly concentrated, such that the ratio of first product ingredient 112 relative to second and/or third product ingredients 122, 132 in the final beverage product may be relatively high.

As mentioned above, first product ingredient 112 may be water. Accordingly, at some locations in which mobile product dispenser 10 may be implemented, first product ingredient 112 may be easily replenished via an on-site water supply (e.g., a water tank, tap water, city water, or municipal water). However, second and/or third product ingredients 122, 132 may be produced off-site (e.g., by a flavoring manufacturer), and may need to be shipped to the location of mobile product dispenser 10 to be utilized.

Since a significant proportion of production, shipping, storage, and other manufacturing and distribution costs are often derived from the volume and weight of the product, using a larger proportion of product ingredients that are available on-site may reduce the overall cost associated with products dispensed by product dispensing system 100. Thus, by utilizing a larger ratio of first product ingredient 112 relative to second and/or third product ingredients 122, 132 in the final beverage product, the overall costs of a dispensed product may be reduced, since a larger proportion of a dispensed beverage product's weight and volume may be attributable to first product ingredient 112, as a constituent part of the beverage.

Further, since mobile product dispenser 10 may operate in environments with limited traversable space and/or narrow pathways (e.g., restaurants, offices, or gyms), it may be desirable that mobile product dispenser 10 be relatively compact in size. It may also be desirable for mobile product dispenser 10 to dispense a wide variety of products such that users have a greater selection of products from which to choose. However, if utilizing weakly concentrated or non-concentrated flavorings, for example, the amount of space within mobile product dispenser 10 that may be needed to store such flavorings may be relatively large, which may result in an overall increase in size of mobile product dispenser 10. Alternatively, smaller ingredient chambers 120, 130 may be utilized to maintain the compactness of mobile product dispenser 10, but such a configuration may require such flavorings to be replenished more frequently, which may increase the downtime of mobile product dispenser 10.

As mentioned above, first product ingredient 112 may be mixed with second and/or third product ingredients 122, 132 to create various types of dispensed products. Since first product ingredient 112 may be commonly included in several types of beverages, utilizing a relatively high ratio of first product ingredient 112 relative to second and/or third product ingredients 122, 132 in dispensed products may decrease the amount of space required for each type of product. For example, since a larger proportion of each type of product is comprised of a common ingredient stored in first ingredient chamber 110, the size of second and/or third ingredient chambers 120, 130 may remain relatively small and, thus, more ingredient chambers may be disposed within an interior space 12 of mobile product dispenser 10 without a significant increase of its overall size. In this manner, more highly-concentrated second and/or third product ingredients 122, 132, for example, may permit mobile product dispenser 10 to dispense a greater variety of products while maintaining a relatively small footprint.

In some embodiments, the ratio of first product ingredient 112 relative to second and/or third product ingredients 122, 132 in a dispensed beverage product is at least 3:1. In some embodiments, the ratio of first product ingredient 112 relative to second and/or third product ingredients 122, 132 in a dispensed beverage product is at least 5:1. In some embodiments, the ratio of first product ingredient 112 relative to second and/or third product ingredients 122, 132 in a dispensed beverage product is approximately 5:1. In some embodiments, the ratio of first product ingredient 112 relative to second and/or third product ingredients 122, 132 in a dispensed beverage product is at least 7:1.

In some embodiments, mobile product dispenser 10 may have a footprint area of less than approximately 8 square feet. In some embodiments, mobile product dispenser 10 may have a footprint area of less than approximately 6 square feet. In some embodiments, mobile product dispenser 10 may have a footprint area of less than approximately 4 square feet.

In some embodiments, product dispensing system 100 includes a carbonation system 150. In embodiments, carbonation system 150 may include a carbonation chamber 152, a carbonator 154, and a pressure regulator 156. Carbonation system 150 may be configured to, for example, inject, dissolve, or otherwise add carbon dioxide to one or more of product ingredients 112, 122, 132. Carbonation chamber 152 may be, for example, a chamber, cylinder, vessel, tank or the like configured to store gas (e.g., carbon dioxide gas) under pressure. Pressure regulator 156 may be or may include, for example, a valve configured to control the output flow of gas stored in carbonation chamber 152. Carbonator 154 may be, for example, a device configured to inject, dissolve, or otherwise add carbon dioxide (e.g., from carbonation chamber 152) to one or more of product ingredients 112, 122, 132.

In some embodiments, carbonator 154 may be configured to add carbon dioxide to first product ingredient 112. As mentioned above, first product ingredient 112 may be water that, when carbonated by carbonation system 150, may become carbonated water, or the like. In some embodiments, after first product ingredient 112 has been carbonated by carbonation system 150, it may then be combined with second product ingredient 122 and/or third product ingredient 132 to form, for example, a soft drink, flavored water, flavored sparkling water, fountain drink, flavored drink, or other mixed drink.

Product dispensing system 100 may include a product dispenser 170 that may be configured, for example, to dispense products to users. Product dispenser 170 may include a nozzle 172 through which a product (e.g., a beverage product) may be dispensed to a user. Although FIG. 1 shows product dispenser 170 to have a single nozzle 172, product dispenser 170 may include one, two, three, four, five, six or more nozzles 172. In some embodiments, one nozzle 172 may be configured to dispense several types of beverage products. In some embodiments, each nozzle 172 may be configured to dispense only a single type of beverage product. In some embodiments, some nozzles 172 may dispense several types of beverage products and other nozzles 172 may dispense only a single type of beverage product.

Product dispensing system 100 may include one or more pumps 140 that may be configured to move product ingredients 112, 122, 132 from their respective ingredient chambers 110, 120, 130 to product dispenser 170 for dispensing to a user. Pump 140 may be, for example, a beverage pump, syrup pump, or other device that is configured to move product ingredients 112, 122, 132. Product dispensing system 100 may include piping 190 that may be configured to convey product ingredients 112, 122, 132 from one location to another such as, for example, from ingredient chambers 110, 120, 130 to product dispenser 170.

In some embodiments, product dispensing system 100 includes a waste tank 180. Waste tank 180 may be configured to store waste such as, for example, liquid waste. Product dispenser 170 may include a drain 182 that is interconnected to waste tank 180. In some embodiments, piping 190 may be configured to convey waste from drain 182 to waste tank 180. In some embodiments, drain 182 is disposed beneath nozzle 172 such that products that are dispensed from nozzle 172, but not collected by a user, may then flow into waste tank 180 for storage.

In some embodiments, one or more of product ingredient chambers 110, 120, 130, carbonation chamber 152, and/or waste tank 180 may include level sensors configured to measure the amount of material currently disposed in the respective chamber and/or tank. In some embodiments, control unit 400 (described further below) may receive electronic data from the level sensors, and use the received information to determine if one or more of product ingredient chambers 110, 120, 130 and/or carbonation chamber 152 should be refilled, and/or if waste tank 180 should be emptied.

Product dispensing system 100 may include a temperature control system 160. In some embodiments, temperature control system 160 may be configured to adjust and/or control the temperature of one or more of product ingredients 112, 122, 132 by, for example, removing or adding heat to one or more of product ingredients 112, 122, 132. Temperature control system 160 may be or may include, for example, a thermoelectric cooler, a refrigeration system, or other powered cooling system. In some embodiments, temperature control system 160 may receive power, for example, from a power storage system 320 (described further below). In some embodiments, temperature control system 160 may be or may include a passive cooling system such as, for example, ice, an ice pack, cool pack, or other thermal capacitor capable of absorbing considerable amounts of heat. In some embodiments, temperature control system 160 may be or may include a thermoelectric heater, heat pump, or other powered heating system. In some embodiments, temperature control system 160 may be or may include a passive heating system such as, for example, a heat pack, chemical heat pack, or other thermal capacitor capable of releasing considerable amounts of heat.

As shown in FIG. 1, for example, temperature control system 160 may be hydraulically disposed between first ingredient chamber 110 and product dispenser 170 such that the temperature of first product ingredient 112 may be adjusted (e.g., heated and/or cooled) by temperature control system 160 as it is moved (e.g., by pump 140) from first ingredient chamber 110 to product dispenser 170. In this manner, temperature control system 160 may permit chilled beverage products and/or hot beverage products to be dispensed from product dispenser 170.

In some embodiments, temperature control system 160 may be configured to create ice that may be dispensed to users, for example, via product dispenser 170. For example, temperature control system 160 may receive first product ingredient 112 (which may be, e.g., water), and chill first product ingredient 112 until it freezes into a solid form (e.g., ice cubes).

In some embodiments, user interface 200 comprises a touch screen display for receiving user input and/or for communicating information to the user. In some embodiments, user interface 200 may include electromechanical buttons for receiving input from a user. In some embodiments, user interface 200 may include a visual display for communicating with or displaying information to a user. In some embodiments, user interface 200 may include a combination of touch screens, electromechanical buttons, and/or visual displays.

User interface 200 may display information about products that may be dispensed from mobile product dispenser 10. In some embodiments, a user may select the type of product to be dispensed from product dispenser 170 via user interface 200. In some embodiments, a user may initiate and/or halt the dispensing of a product from product dispenser 170 via user interface 200.

User interface 200 may include an item scanner 210, which may include one or more readers or scanners for reading a machine readable item, which may be used for identifying a customer or identifying payment information, for example. Machine readable items may include, but are not limited to, a barcode, a magnetic strip, a quick response (QR) code, a radio frequency identification (RFID) tag, a Bluetooth-enabled device (e.g., a cell phone), a Bluetooth Low Energy (BLE) device, or an ultrasound communication device, (e.g., a device having LISNR® ultrasound technology).

User interface 200 may also include a biometric scanner 220 configured for identifying one or more biometric characteristics of a user. Biometric scanner 220 may include, for example but not limited to, a fingerprint reader, a finger vein scanner, a retinal scanner, an iris scanner, a camera (for taking a photo and/or recording a video), or a microphone. The biometric characteristic(s) of a customer may include, for example, a fingerprint, a finger vein pattern, a retinal profile, an iris profile, a face profile, and/or a voice profile.

In some embodiments, heavier components of mobile product dispenser 10 may be disposed in a relatively low position within interior space 12 of mobile product dispenser 10. In this manner, the center of gravity of mobile product dispenser 10 may be lower, which may increase the stability of mobile product dispenser 10. For example, first ingredient chamber 112 (which may be, e.g., the largest ingredient chamber), carbonation chamber 152, temperature control system 160, and/or powertrain system 300 may be disposed in a relatively low position within an interior space 12.

In some embodiments, mobile product dispenser 10 may have certain proportions so that it is more visible to users as it navigates through its operating environment. In some embodiments, mobile product dispenser 10 may be at least 3 feet tall. In some embodiments, mobile product dispenser 10 may be at least 4 feet tall. Further, in some embodiments, mobile product dispenser 10 may be relatively narrow such that it may fit through relatively narrow pathways (e.g., between tables in a restaurant). In some embodiments, mobile product dispenser 10 may be less than 4 feet wide. In some embodiments, mobile product dispenser 10 may be less than 3 feet wide. In some embodiments, mobile product dispenser 10 may have a height that is greater than its width.

As mentioned above, mobile product dispenser 10 may be configured to operate autonomously, which is to say, for example, that mobile product dispenser 10 may operate without direct human intervention. In some embodiments, control unit 400 may be configured to enable mobile product dispenser 10 to operate autonomously. Control unit 400 may be or may include, for example, a computer, microcontroller, or the like. Control unit 400 may include, for example, a processor, memory, and communication infrastructure for sending and receiving electronic data (e.g., computer-processable data and/or information represented by an analog or digital signal). In some embodiments, control unit 400 may control all aspects of mobile product dispenser 10.

In some embodiments, control unit 400 may include an environmental sensor 410 configured to gather information about the environment surrounding mobile product dispenser 10. Environmental sensor 410 may include one or more sensors such as, for example, an image sensor, camera, infrared sensor, ultrasonic sensor, radar, and/or light detection and ranging ("LIDAR") sensor. Environmental sensor 410 may include sensors to determine, for example, the location, speed, and/or trajectory of mobile product dispenser 10. In this manner, environmental sensor 410 may comprise a navigation sensor and may include, for example, a global positioning system ("GPS"), wheel speed sensors, and/or accelerometers. Although FIG. 1, for example, shows a single environmental sensor 410 disposed on mobile product dispenser 10, mobile product dispenser 10 may include multiple environmental sensors 410 disposed on any portion of mobile product dispenser 10.

Control unit 400 may receive electronic data from environmental sensor 410 and use the received electronic data to automatically move mobile product dispenser 10 through the surrounding environment and/or to a destination. For example, control unit 400 may use the electronic data received from environmental sensor 410 to determine if and/or how mobile product dispenser 10 should navigate through the environment and/or to a destination. In order to control the movement of mobile product dispenser 10, control unit 400 may, for example, send instructions to and/or otherwise control operations of powertrain system 300 (described in further detail below). Control unit 400 may, for example, control the speed, acceleration, and/or trajectory of mobile product dispenser 10 via powertrain system 300.

Powertrain system 300 may include a propulsion system 310 and a power storage system 320. Propulsion system 310 may include, for example, an electric motor, an internal combustion engine, or a hybrid design including components of both an electric motor and combustion engine. Power storage system 320 may include, for example, one or more batteries, rechargeable batteries, and/or fuel tanks to store energy to power propulsion system 310 and/or other elements of mobile product dispenser 10. Powertrain system 300 may include one or more wheels 330 that receive power from propulsion system 310 in order to move and/or steer mobile product dispenser 10. Wheels 330 may be configured for indoor, outdoor, and/or off-road travel.

Powertrain system 300 may be configured to provide autonomous mobility for mobile product dispenser 10. As discussed above, powertrain system 300 may receive instructions from and/or otherwise be configured to be controlled by control unit 400. For example, powertrain system 300 may receive electronic data from control unit 400, and may adjust the speed and/or trajectory of mobile product dispenser 10 based on the received electronic data. In some embodiments, the speed of mobile product dispenser 10 may be adjusted, for example, by changing the speed at which wheels 330 are rotated by propulsion system 310. In some embodiments, the trajectory of mobile product dispenser 10 may be adjusted, for example, by turning wheels 330 and/or adjusting the speed and/or direction of rotation of wheels 330.

Figure 4:
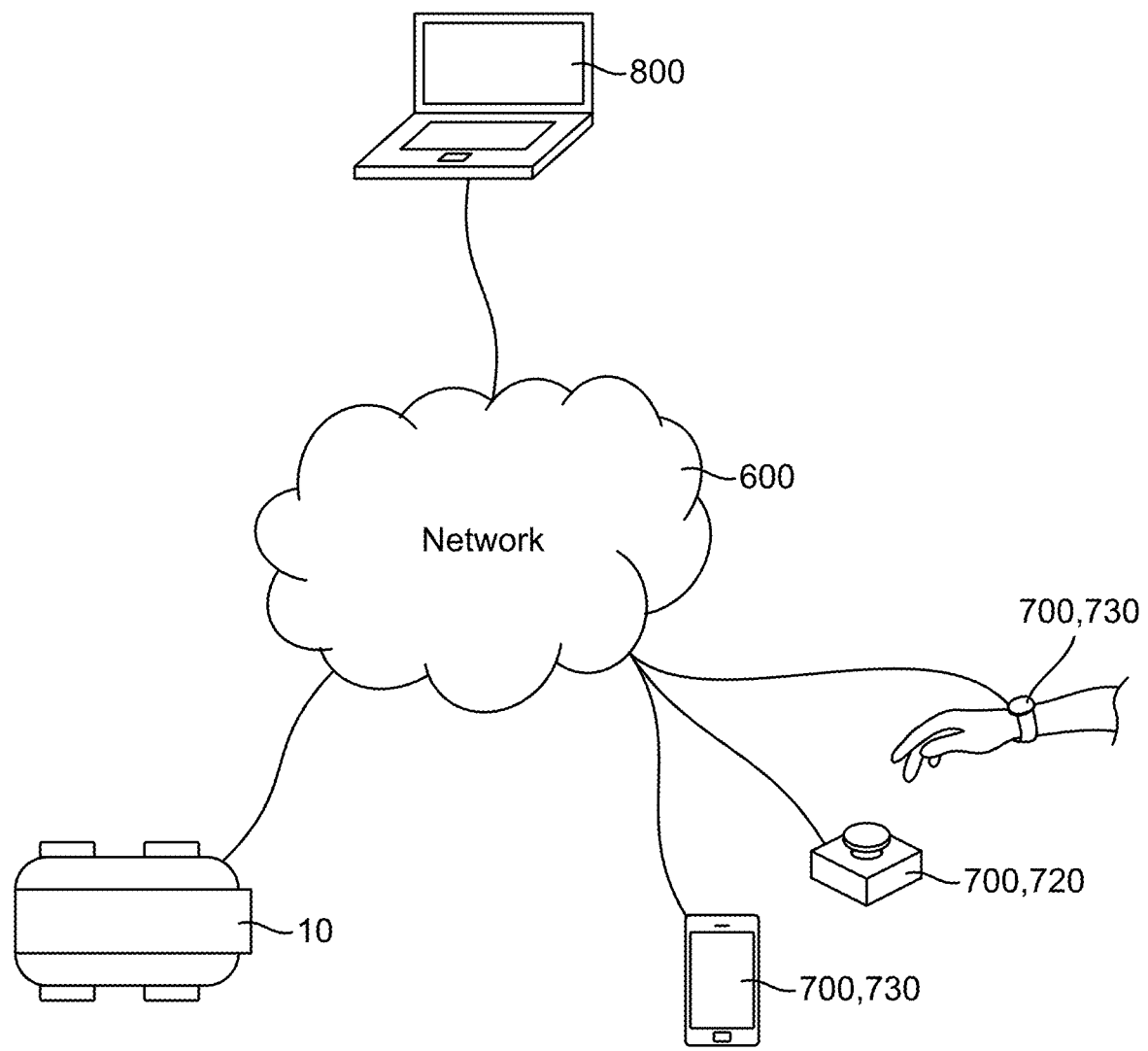
FIG. 4 depicts an exemplary network environment suitable for use and interconnection of exemplary components described herein, according to some embodiments.

With references to FIGS. 1 and 4, control unit 400 may include a transceiver 420 that is configured to send and receive information wirelessly. Transceiver 420 may allow control unit 400 to connect to a network 600, which may include, for example, a Wireless Local Area Network ("WLAN"), Campus Area Network ("CAN"), Metropolitan Area Network ("MAN"), and/or Wide Area Network ("WAN"). Transceiver 420 may be configured to operate on a variety of frequencies, such as Very High Frequency or Ultra High Frequency ranges, and may be compatible with specific network standards such as cell phone, WIFI™, or BLUETOOTH® wireless networks, for example. In some embodiments, control unit 400 may connect to network 600 through a wired connection such as, for example, an Ethernet cable.

As exemplified in FIG. 4, mobile product dispenser 10 may communicate with a user device 700 over network 600. User device 700 may be, for example, a computing device capable of connecting to network 600 through a wired or wireless connection. In some embodiments, user devices 700 may connect directly to mobile product dispenser 10 via a peer-to-peer network, for example. As described in further detail below, user device 700 may be configured to summon mobile product dispenser 10 to a particular location, to display information about products that may be dispensed from mobile product dispenser 10, and/or to complete transactions, for example.

In some embodiments, user device 700 may be a summoning device 720. Summoning device 720 may be, for example, a computing device capable of connecting to network 600 and/or to mobile product dispenser 10 through a wired or wireless connection. In some embodiments, summoning device 720 may be a device dedicated to summoning mobile product dispenser 10 to a particular location. As described in further detail below, summoning device 720 may be, for example, a call button configured to summon mobile product dispenser 10 to a particular location within the operating environment of mobile product dispenser 10. In some embodiments, each summoning device 720 may be associated with a particular fixture 710 (see, e.g., FIG. 5) such as, for example, a table, desk, gym machine, or the like. In some embodiments, summoning device 720 may be disposed on, coupled to, or integrally formed with a particular fixture 710.

In some embodiments, user device 700 may be a user mobile device 730 such as, for example, a cell phone, smartphone, wearable computer, smartwatch, tablet computer, laptop computer, or other computing device capable of connecting to network 600 through a wired or wireless connection. In some embodiments, user mobile device 730 may be used to summon and/or interact with mobile product dispenser 10, but may also include features and functionality unrelated to mobile product dispenser 10 (e.g., a smartphone or smartwatch).

In some embodiments, an administrator device 800 may also be connected to network 600, and may be used to monitor and/or send information between user devices 700 and mobile product dispenser 10. Administrator device 800 may be configured to manage user accounts, product inventory, as well as to process transactions. Mobile product dispenser 10 may notify administrator device 800 when, for example, product ingredients 112, 122, 132 are low and may need to be refilled. Administrator device 800 may be able to connect to control unit 400 remotely, in order to control the functions of mobile product dispenser 10 or to diagnose technical issues, for example.

Administrator device 800 may be configured to authenticate a customer based on the machine readable item identified by item scanner 210 or the biometric characteristic(s) identified by biometric scanner 220. After authenticating a customer, administrator device 800 may associate the authenticated customer with a customer account. In some embodiments, administrator device 800 may locate a particular customer account in a database based on the machine readable item identified by item scanner 210. In some embodiments, administrator device 800 may locate a particular customer account in a database based on the biometric characteristic(s) identified by biometric scanner 220. Administrator device 800 may locate a particular customer account by comparing identified biometric characteristic(s) of a customer against a database of authorized biometric characteristics.

In some embodiments, user device 700 may include an application configured to receive information from and send information to mobile product dispenser 10. In some embodiments, user device 700 may be configured to display information such as, for example, user account information, a list of products available for purchase and their prices, nutritional information of products, images of products available for purchase, and/or a summary of the transaction. In some embodiments, a user may be required to log in to an application (e.g., by providing a username and/or password) on user device 700 before interacting with or completing a transaction with mobile product dispenser 10.

Control unit 400 and/or administrator device 800 may include memory for storing information about mobile product dispenser 10 and/or user device 700. This information may include, for example, product information, mobile product dispenser information, user information, transaction locations, transaction times, and/or other information. In some embodiments, the information may include a user's dietary restrictions, dietary preferences, and/or allergens.

Figure 3:
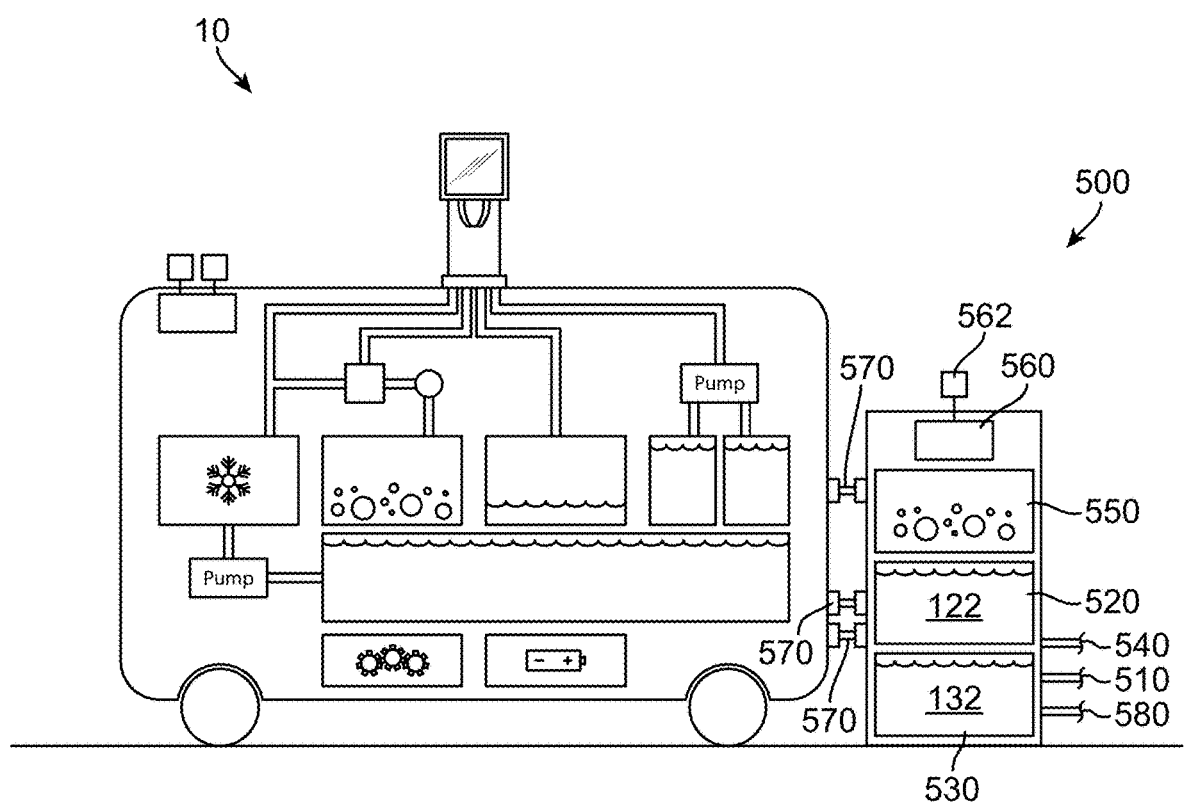
FIG. 3 is a partial sectional view of a mobile product dispenser and a docking station according to some embodiments.

With reference to FIGS. 1 and 3, a docking station 500 may be configured to receive mobile product dispensers 10, as described herein. In some embodiments, docking station 500 may include one or more docking connectors 570. Docking connector 570 may be configured to automatically connect to a docking port disposed on mobile product dispenser 10. Docking connectors 570 may include, for example, a power cord, fuel line, and/or other wiring and/or piping to convey materials, products, and/or information between docking station 500 and mobile product dispenser 10.

When docking connector 570 is connected to mobile product dispenser 10, for example, mobile product dispenser 10 may receive power or fuel from docking station 500 in order to replenish power storage system 320. In some embodiments, docking station 500 may be connected to grid electricity 540, and may transform the electricity in order to recharge batteries in mobile product dispenser 10.

In some embodiments, docking station 500 may include one or more ingredient chambers configured to store product ingredients 122, 132. As shown in FIG. 3, for example, docking station 500 may include a first ingredient chamber 520 and a second ingredient chamber 530. However, docking station 500 may include more than or less than two product ingredient chambers. For example, in some embodiments, docking station 500 includes one, two, three, four, five, six or more product ingredient chambers.

In some embodiments, first ingredient chamber 520 may store a different kind of ingredient than second ingredient chamber 530. For example, second ingredient 122 may be stored in first ingredient chamber 520, and third ingredient 132 may be stored in second ingredient chamber 530. When docking connector 570 is connected to mobile product dispenser 10, for example, mobile product dispenser 10 may receive product ingredients 122, 132 from docking station 500 in order to replenish second and third ingredient chambers 120 and 130 of product dispensing system 100.

In some embodiments, docking station 500 may be connected to a water supply 510. Water supply 510 may be, for example, a water tank, tap water, city water, municipal water, or the like. As mentioned above, first product ingredient 112 may be water. Thus, when docking connector 570 is connected to mobile product dispenser 10, for example, mobile product dispenser 10 may receive first product ingredient 112 from docking station 500 in order to replenish first ingredient chamber 110 of product dispensing system 100.

In some embodiments, docking station 500 may include carbonation chamber 550 configured to store gas (e.g., carbon dioxide gas) under pressure. When docking connector 570 is connected to mobile product dispenser 10, for example, mobile product dispenser 10 may receive stored gas from docking station 500 in order to replenish carbonation chamber 152 of product dispensing system 100.

In some embodiments, docking station 500 may include a drain outlet 580. When docking connector 570 is connected to mobile product dispenser 10, for example, waste from waste tank 180 of mobile product dispenser 10 may be emptied and disposed of via drain outlet 580.

Docking station 500 may include a control unit 560, which may include features and functionality similar to control unit 400 described above. Docking station 500 may include a transceiver 562 that is configured to send and receive information wirelessly. Transceiver 562 may allow docking control unit 560 to connect to network 600 and/or to mobile product dispenser 10. Transceiver 562 may be configured to operate on a variety of frequencies, such as Very High Frequency or Ultra High Frequency ranges, and may be compatible with specific network standards such as cell phone, WIFI™, or BLUETOOTH® wireless networks, for example. In some embodiments, docking control unit 560 may connect to network 600 through a wired connection.

Control unit 400 and/or control unit 560 may be configured to automatically control interactions between mobile product dispenser 10 and docking station 500. For example, control unit 400 and/or control unit 560 may be configured to enable one or more of product ingredient chambers 110, 120, 130 and/or carbonation chamber 152 to be refilled automatically. In some embodiments, control unit 400 and/or control unit 560 may be configured to enable waste tank 180 to be emptied automatically. In some embodiments, control unit 400 and/or control unit 560 may be configured to enable power storage system 320 to be replenish automatically.

Figure 2:
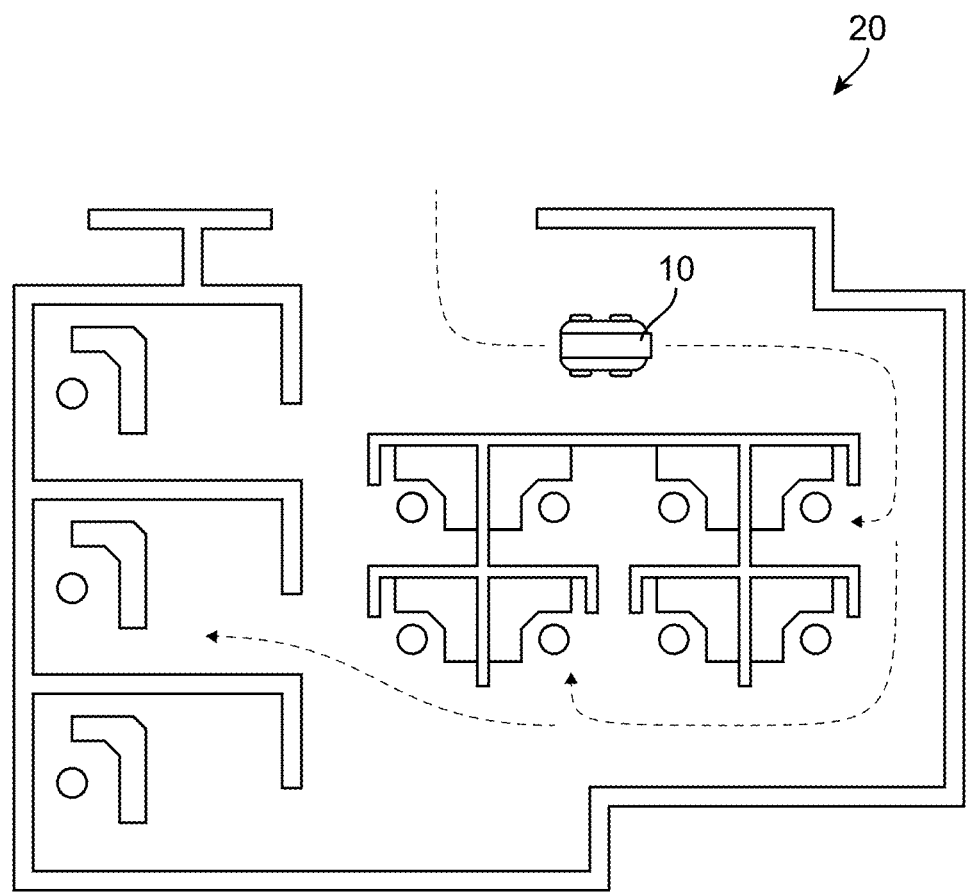
FIG. 2 is a schematic view of a mobile product dispenser in an example environment of operation according to some embodiments.

With reference to FIG. 2, for example, mobile product dispenser 10 may be configured to autonomously navigate through its environment of operation 20. In some embodiments, mobile product dispenser 10 may be configured to operate only within a particular area or environment 20. In some embodiments, environment 20 may be, for example, an office, restaurant, gym, building, campus, stadium, event venue, or the like. As shown in FIG. 2, mobile product dispenser 10 may travel to users at various location in order to dispense products to the user. As described in further detail below, mobile product dispenser 10 may freely roam through environment 20, may follow a particular predetermined path within environment 20, and/or may be summoned to a particular location by a user within environment 20.

Figure 5:
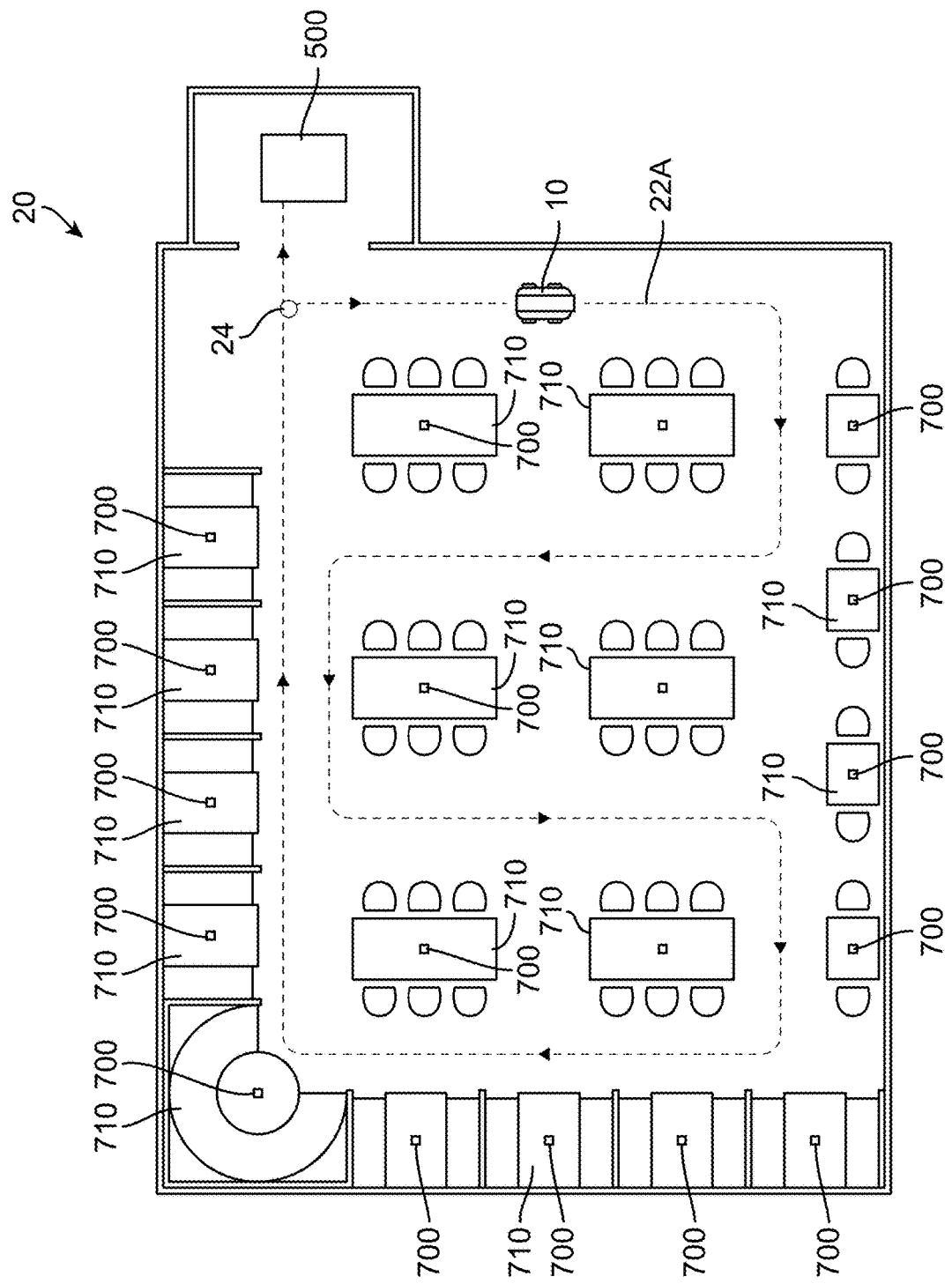
FIGS. 5-8 are schematic views of a mobile product dispenser in an example environment of operation according to some embodiments.

FIG. 5, for example, shows mobile product dispenser 10 operating in a restaurant environment 20. As shown, mobile product dispenser 10 may be configured to follow a predetermined route 22A within environment 20. Predetermined route 22A may be, for example, a path that mobile product dispenser 10 continuously traverses by default. In some embodiments, predetermined route 22A may form a complete loop.

Mobile product dispenser 10 may engage with and dispense products to users as it navigates along predetermined route 22A. In some embodiments, predetermined route 22A may be a path chosen such that mobile product dispenser 10 travels near to many or all potential users within operating environment 20. For example, predetermined route 22A may be a path chosen such that mobile product dispenser 10 travels past or near to each table in a restaurant, each desk in an office, each workout area in a gym, or the like. In some embodiments, predetermined route 22A may be a pathway that is optimized such that mobile product dispenser 10 more frequently visits areas with more potential users (e.g., areas of a restaurant with more tables), or areas with more frequent users (e.g., areas of a gym where users rehydrate more frequently).

Mobile product dispenser 10 may, for example, survey environment 20 and calculate the most efficient pathway to reach each desired location in environment 20. In some embodiments, mobile product dispenser 10 may automatically determine predetermined route 22A based on, for example, environmental geography, past transaction data, dispensing times, dispensing locations, and/or other historical data.

With reference to FIGS. 5-8, while mobile product dispenser 10 may be configured to follow predetermined route 22A by default, mobile product dispenser 10 may also be configured to deviate from predetermined route 22A, for example, when summoned by a user device 700. In this manner, mobile product dispenser may passively serve users as it travels along predetermined route 22A, or may actively serve users who request that mobile product dispenser 10 to travel to their location.

As shown in FIG. 5, for example, when no user devices 700 are summoning mobile product dispenser 10, mobile product dispenser 10 may follow predetermined route 22A. As mentioned above, mobile product dispenser 10 may be summoned by a user to a particular location using user device 700.

If a user desires to summon mobile product dispenser, user device 700 may automatically determine the location of the user, or may ask the user to provide location information, which may include the current location of the user or another location where the user would like to meet mobile product dispenser 10. In some embodiments, user device 700 may request that the user enter a number (or other identifying information) associated with a particular fixture 710 (e.g., a table number). Mobile product dispenser 10 may maintain a list of locations associated with each fixture 710, and may compare the number received from the user to the list of locations in order to determine the location of the user. After receiving the user location information from the summoning user device 700A, mobile product dispenser 10 may automatically maneuver to the location of summoning user device 700A.

Figure 6:
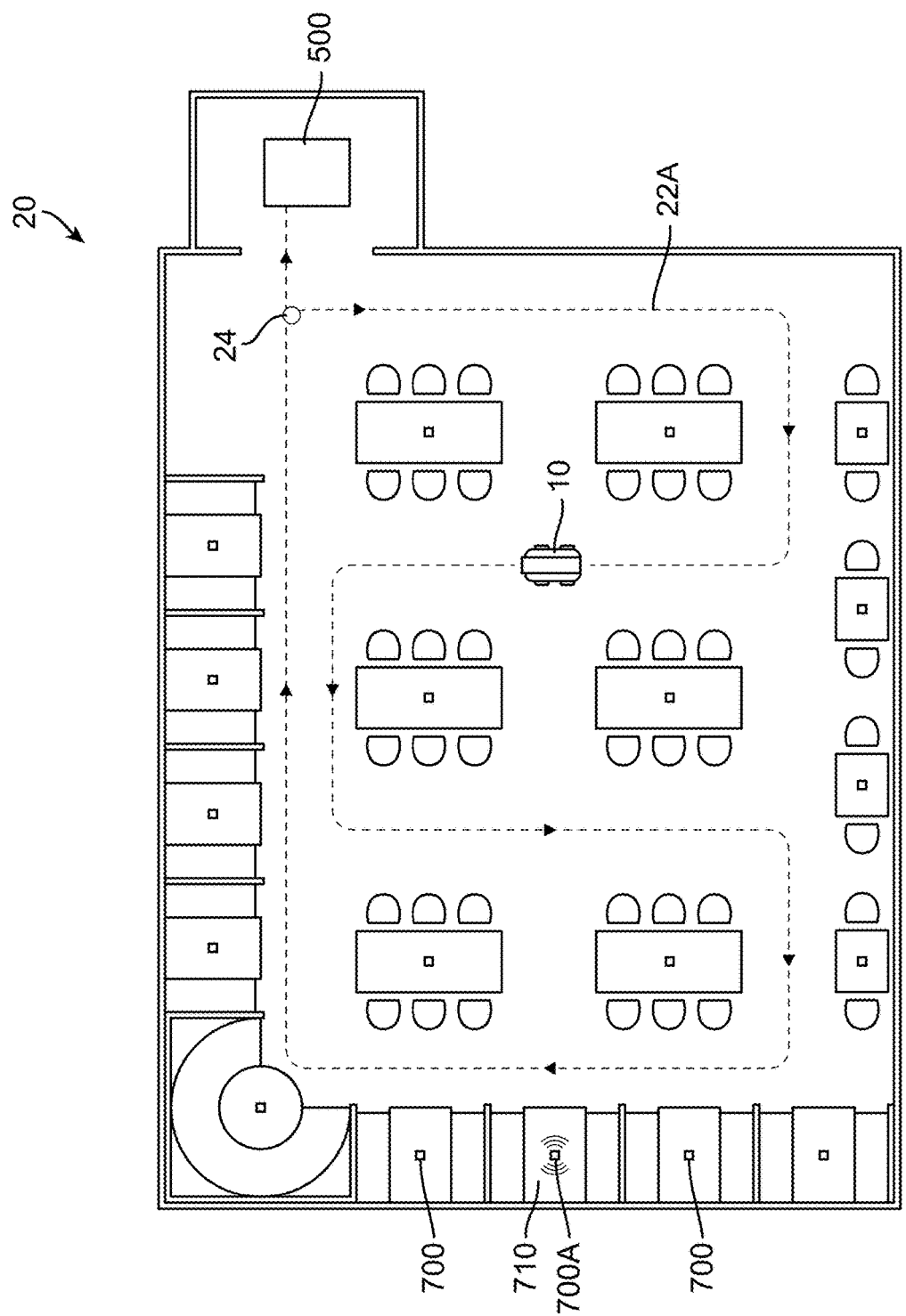
Figure 7:
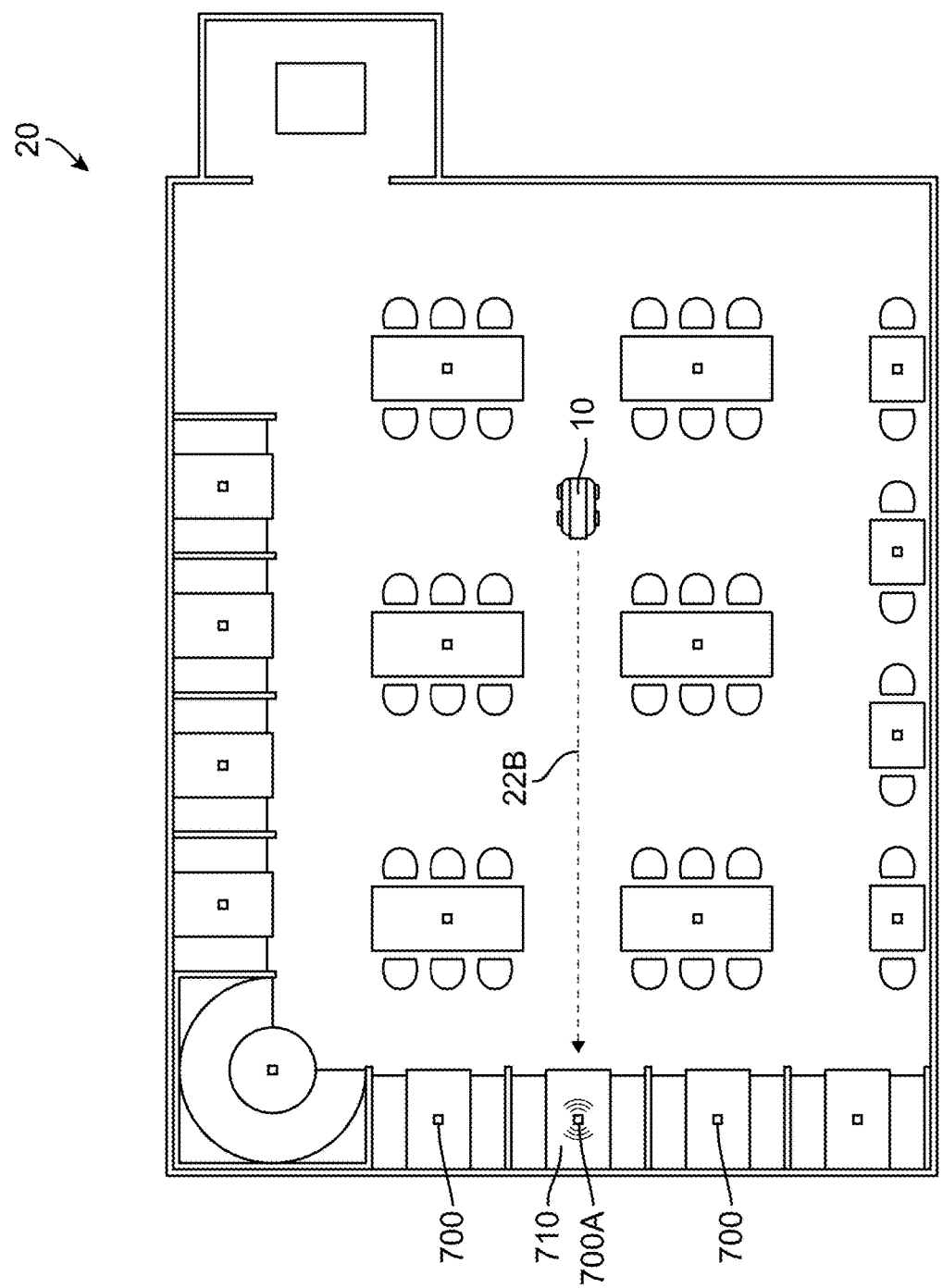
Figure 8:
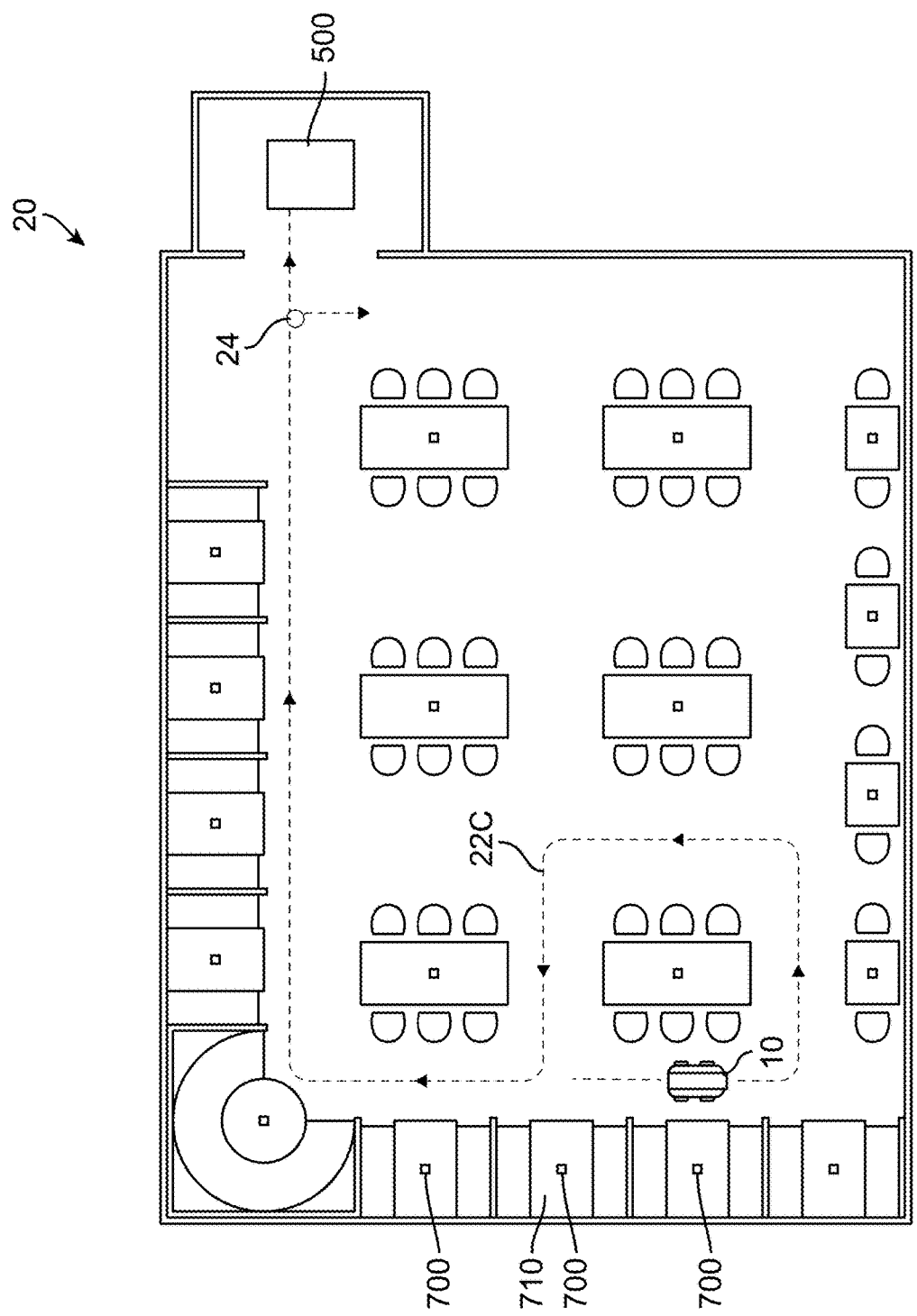

As shown in FIGS. 6 and 7, for example, after mobile product dispenser 10 receives a summoning request from a summoning user device 700A (e.g., via network 600), mobile product dispenser 10 may then determine a priority route 22B for navigating to the location of summoning user device 700A. After navigating to the location of summoning user device 700A and serving one or more users at the location, mobile product dispenser 10 may then determine a new temporary route 22C. Temporary route 22C may be, for example, a pathway chosen such that mobile product dispenser 10 returns to areas along predetermined route 22A that may have been skipped as a result of mobile product dispenser following priority route 22B. After completing temporary route 22C, for example, mobile product dispenser 10 may then return to predetermined route 22A.

In some embodiments, if control unit 400 determines that product dispensing system 100 is out of or running low on product ingredients 112, 122, 132, for example, or if waste tank 180 is full or nearly full, mobile product dispenser 10 may automatically navigate to docking station 500 for refilling, refueling, and/or disposing of waste.

In some embodiments, predetermined route 22A may include one or more decision points 24 at which mobile product dispenser 10 may determine whether or not it should navigate to docking station 500 for refilling, refueling, and/or disposing of waste. For example, at decision point 24, mobile product dispenser 10 may evaluate whether or not it can likely complete another loop along predetermined route 22A without needing to refill, refuel, and/or dispose of waste. For example, mobile product dispenser 10 may compare the amount of product ingredients 112, 122, 132 remaining in product ingredient chambers 110, 120, 130, for example, to the amount that is normally dispensed in one loop of predetermined route 22A. If it is determined that it is unlikely that mobile product dispenser 10 will complete another loop of predetermined route 22A, mobile product dispenser 10 may then automatically navigate to docking station 500 for refilling, refueling, and/or disposing of waste. Decision point 24 may be disposed relatively near to docking station 500. In this manner, the downtime associated with refilling, refueling, and/or disposing of waste may be reduced, since the time required to travel to and from docking station 500 may be decreased.

In some embodiments, mobile product dispenser 10 may be configured to accept payment directly from a user. For example, user interface 200 may include a payment system for accepting payment from a user (e.g., a bill validator, coin slot, or credit card reader). In some embodiments, such a payment system may be configured to accept payment using a digital wallet service and/or a mobile payment service, for example, via item scanner 210.

In some embodiments, before utilizing mobile product dispenser 10, users may acquire a container such as, for example, a cup, bottle, thermos, or the like that may include a unique identifier that may be associated with the user. Before dispensing a product, item scanner 210, for example, may read the unique identifier of the container, determined the identity of the user based on the unique identifier, and then automatically charge a payment method (e.g., a stored credit card) associated with the identified user.

In some embodiments, mobile product dispenser 10 may be configured to identify a user, for example, via biometric scanner 220, and then automatically charge a payment method (e.g., a stored credit card) associated with the identified user.

In some embodiments, mobile product dispenser 10 may be integrated into a point-of-sale system of the environment 20 in which mobile product dispenser 10 is operating. For example, if mobile product dispenser 10 is operating in a restaurant environment 20, mobile product dispenser 10 may automatically add the cost of dispensed products to a customer's dining bill. Similarly, if mobile product dispenser 10 is operating in a gym environment 20, for example, mobile product dispenser 10 may automatically add the cost of dispensed products to a customer's membership account.

In some embodiments, the cost charged to a user may be based on the type of product dispensed. For example, one dispensed product (e.g., a soda) may have a first cost, and another dispensed product (e.g., a juice) may have a different cost. Similarly, one dispensed product (e.g., a soda) may have a fixed cost that includes free refills, and another dispensed product (e.g., a juice) may have a cost is dependent upon the number of refills. In some embodiments, the cost charged to a user may be based on the amount (e.g., volume) of product dispensed. In this manner, if a user is utilizing their own product container (e.g., a reusable bottle), the user may fill the container to their desired level, and may be charged accordingly based on the amount of product dispensed. In some embodiments, product dispenser 170 may include a flow meter, flow sensor, or the like that measures the amount (e.g., volume) of product dispensed.

As described above, control unit 400 and/or administrator device 800 may store product information, transaction history, and/or user information. This stored information may be used, for example, to make product recommendations to users. After mobile product dispenser 10 arrives at the location of a user and the user's identity has been confirmed, user interface 200 and/or user mobile device 730, for example, may indicate products that the user has purchased and/or consumed in the past, indicate products that the user might like based on past interaction, and/or indicate products that contain known allergens of the user.

In some embodiments, user mobile device 730 may include health monitors such as, for example, a hydration monitor and/or a glucose monitor. In some embodiments, mobile product dispenser 10 may receive health related information from user mobile device 730 and navigate to users automatically based on the health related information.

For example, if user mobile device 730 determines that the user is dehydrated, user mobile device 730 may automatically summon mobile product dispenser 10 to the location of the user. When mobile product dispenser 10 arrives at the location of the user, mobile product dispenser 10 may recommend (e.g., via a message on user interface 200) that the user consume a particular type of product to maintain a healthy hydration level. Similarly, if user mobile device 730 determines that the user has low glucose levels, user mobile device 730 may automatically summon mobile product dispenser 10 to the location of the user. When mobile product dispenser 10 arrives at the location of the user, mobile product dispenser 10 may recommend (e.g., via a message on user interface 200) that the user consume a particular type of product to maintain a healthy glucose level.

In some embodiments, mobile product dispenser 10 may also recommend activities for user. For example, if mobile product dispenser 10 determines that a particular user has been sitting in the same location for an extended period of time, mobile product dispenser 10 may recommend (e.g., via a message on user interface 200) that the user take a walk. Mobile product dispenser 10 may also receive activity level information (e.g., a step count) from user mobile device 730, and use the information to make activity recommendations to the user.

Figure 9:
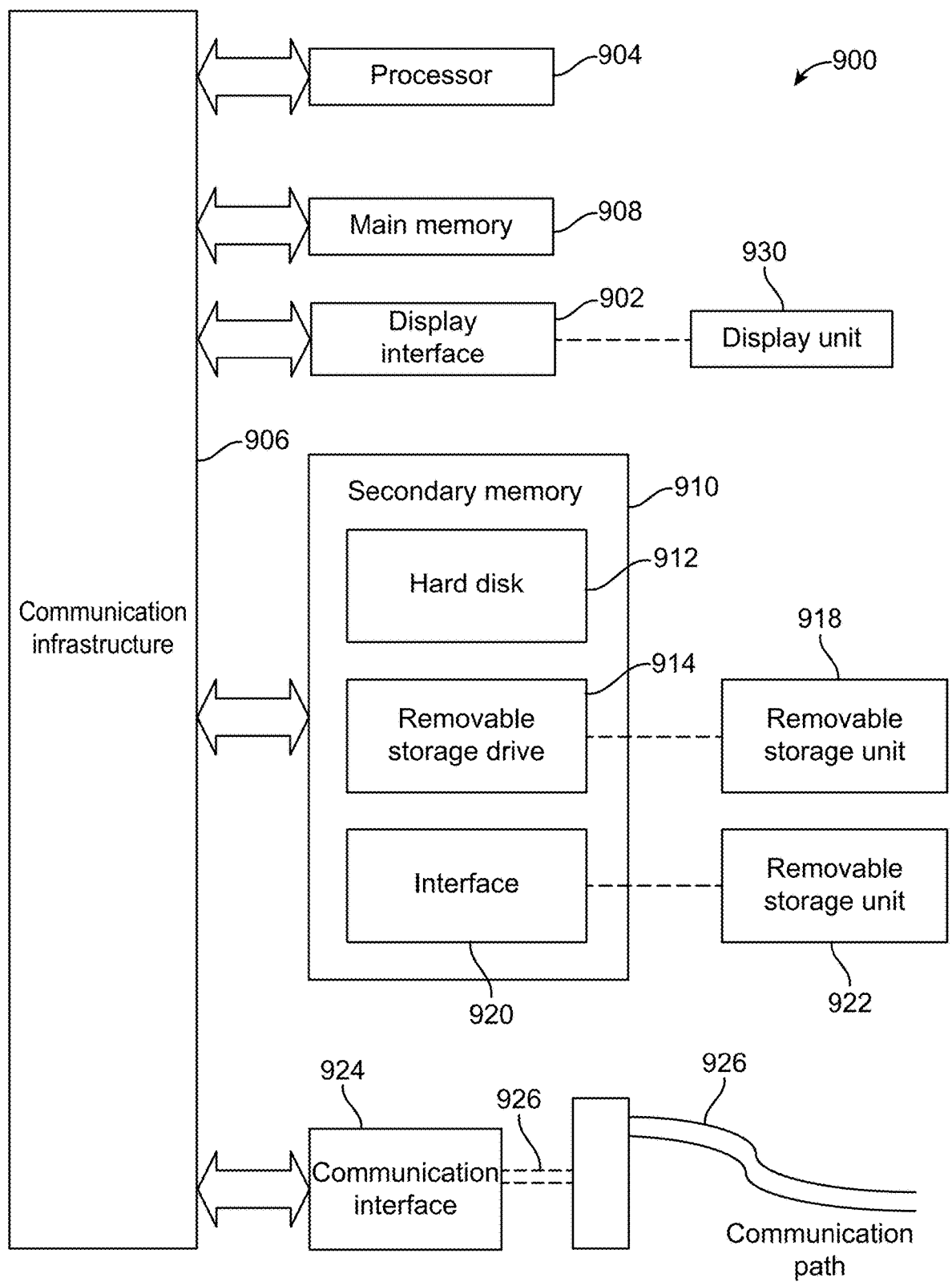
FIG. 9 is a schematic block diagram of an exemplary computer system in which embodiments may be implemented.

FIG. 9 illustrates an exemplary computer system 900 in which embodiments, or portions thereof, may be implemented as computer-readable code. For example, collection of customer data (e.g., biometric data), identification of a customer based on collected data, authentication of customer accounts, and/or tracking of customer accounts may be implemented in computer system 900 using hardware, software, firmware, tangible computer readable media having instructions stored thereon, or a combination thereof and may be implemented in one or more computer systems or other processing systems. Controllers discussed herein may be computer systems having all or some of the components of computer system 900 for implementing processes discussed herein.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, and mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention(s) may be implemented in terms of this example computer system 900. After reading this description, it will become apparent to a person skilled in the relevant art how to implement one or more of the invention(s) using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 904 may be a special purpose or a general purpose processor device. As will be appreciated by persons skilled in the relevant art, processor device 904 may also be a single processor in a multi-core/multiprocessor system, such system operating alone, or in a cluster of computing devices operating in a cluster or server farm. Processor device 904 is connected to a communication infrastructure 906, for example, a bus, message queue, network, or multi-core message-passing scheme.

Computer system 900 also includes a main memory 908, for example, random access memory (RAM), and may also include a secondary memory 910. Secondary memory 910 may include, for example, a hard disk drive 912, or removable storage drive 914. Removable storage drive 914 may include a floppy disk drive, a magnetic tape drive, an optical disk drive, a flash memory, or the like. The removable storage drive 914 reads from and/or writes to a removable storage unit 918 in a well-known manner. Removable storage unit 918 may include a floppy disk, magnetic tape, optical disk, a universal serial bus (USB) drive, etc. which is read by and written to by removable storage drive 914. As will be appreciated by persons skilled in the relevant art, removable storage unit 918 includes a computer usable storage medium having stored therein computer software and/or data.

Computer system 900 (optionally) includes a display interface 902 (which can include input and output devices such as keyboards, mice, etc.) that forwards graphics, text, and other data from communication infrastructure 906 (or from a frame buffer not shown) for display on display unit 930.

In alternative implementations, secondary memory 910 may include other similar means for allowing computer programs or other instructions to be loaded into computer system 900. Such means may include, for example, a removable storage unit 922 and an interface 920. Examples of such means may include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 900.

Computer system 900 may also include a communication interface 924. Communication interface 924 allows software and data to be transferred between computer system 900 and external devices. Communication interface 924 may include a modem, a network interface (such as an Ethernet card), a communication port, a PCMCIA slot and card, or the like. Software and data transferred via communication interface 924 may be in the form of signals, which may be electronic, electromagnetic, optical, or other signals capable of being received by communication interface 924. These signals may be provided to communication interface 924 via a communication path 926. Communication path 926 carries signals and may be implemented using wire or cable, fiber optics, a phone line, a cellular phone link, an RF link or other communication channels.

In this document, the terms "computer program medium" and "computer usable medium" are used to generally refer to media such as removable storage unit 918, removable storage unit 922, and a hard disk installed in hard disk drive 912. Computer program medium and computer usable medium may also refer to memories, such as main memory 908 and secondary memory 910, which may be memory semiconductors (e.g. DRAMs, etc.).

Computer programs (also called computer control logic) are stored in main memory 908 and/or secondary memory 910. Computer programs may also be received via communication interface 924. Such computer programs, when executed, enable computer system 900 to implement the embodiments as discussed herein. In particular, the computer programs, when executed, enable processor device 904 to implement the processes of the embodiments discussed here. Accordingly, such computer programs represent controllers of the computer system 900. Where the embodiments are implemented using software, the software may be stored in a computer program product and loaded into computer system 900 using removable storage drive 914, interface 920, and hard disk drive 912, or communication interface 924.

Embodiments of the invention(s) also may be directed to computer program products comprising software stored on any computer useable medium. Such software, when executed in one or more data processing device, causes a data processing device(s) to operate as described herein.

Embodiments of the invention(s) may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

It is to be appreciated that the Detailed Description section, and not the Summary and Abstract sections, is intended to be used to interpret the claims. The Summary and Abstract sections may set forth one or more but not all exemplary embodiments of the present embodiments as contemplated by the inventor(s), and thus, are not intended to limit the present embodiments and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A product-dispensing system, comprising:
a mobile product dispenser, comprising:
a first product-ingredient chamber, wherein a first product ingredient is disposed within the first product-ingredient chamber,
a second product-ingredient chamber, wherein a second product ingredient is disposed within the second product-ingredient chamber,
a beverage dispensing nozzle;
a control unit configured to store user information related to an identity of a user and a location from a mobile electronic device of the user and to receive the location from the mobile electronic device of the user, wherein the control unit is configured to cause the mobile product dispenser to automatically move to the location received from the mobile electronic device,
a docking port, and
a scanner configured to acquire information usable to authenticate the identity of the user at the location;
wherein the mobile product dispenser is configured to receive a selection of a product, and the mobile product dispenser is configured to complete a transaction with the mobile electronic device; and
wherein the mobile product dispenser is configured to mix the first and second product ingredients to form the product selected by the user after the identity of the user is authenticated and to dispense the product selected by the user; and a docking station configured to connect to the docking port and refill either or both of the first product-ingredient chamber and the second product-ingredient chamber with a beverage ingredient, wherein the docking station comprises a station control unit that comprises a transceiver, wherein the transceiver is configured to send information to and receive information from the mobile product dispenser.

2. The product-dispensing system of claim 1, wherein the first product ingredient is water, and wherein the second product ingredient is flavored syrup.

3. The product-dispensing system of claim 1, wherein the mobile product dispenser further comprises a third product-ingredient chamber and a third product ingredient disposed within the third product-ingredient chamber, wherein the product-dispensing system is configured to dispense a first type of beverage comprising the first and second product ingredients, and wherein the product-dispensing system is configured to dispense a second type of beverage comprising the first and third product ingredients.

4. The product-dispensing system of claim 1, wherein the mobile product dispenser further comprises a carbonation system, wherein a dispensed beverage is carbonated by the carbonation system at the location of the user.

5. The product-dispensing system of claim 1, further comprising a waste chamber, wherein the waste chamber is disposed beneath a product dispenser of the mobile product dispenser, and wherein the waste chamber collects excess beverage that is dispensed by the mobile product dispenser.

6. The product-dispensing system of claim 1, wherein the mobile product dispenser is a carbonated beverage fountain.

7. The product-dispensing system of claim 1, wherein the mobile product dispenser further comprises an ingredient level sensor.

8. An autonomous mobile product-dispensing system, comprising:
a mobile product dispenser, comprising:
a first product-ingredient chamber, wherein a first product ingredient is disposed within the first product-ingredient chamber,
a second product-ingredient chamber, wherein a second product ingredient is disposed within the second product-ingredient chamber,
a control unit, wherein the control unit is configured to allow the mobile product dispenser to move autonomously; and
a scanner configured to acquire information usable to authenticate an identity of a user;
a summoning device in communication with the mobile product dispenser and configured to display a list of products available for purchase, to send a command to summon the mobile product dispenser to a location of the summoning device, and to receive information associated with an identity of a user, and wherein the mobile product dispenser receives health related information from the summoning device, and
an administrator device configured to authenticate the user based on information acquired by the scanner and the information associated with the identity of the user, wherein the mobile product dispenser is configured to autonomously navigate to the location of the summoning device, to authenticate the identity of the user at the location via the scanner, and form a product from at least the first product ingredient and the second product ingredient after authenticating the identity of the user, and wherein at least one of the first and second product ingredients are dispensed at the location of the user.

9. The autonomous mobile product-dispensing system of claim 8, wherein the summoning device is coupled to a fixture disposed in the environment of operation of the mobile product dispenser.

10. The autonomous mobile product-dispensing system of claim 8, wherein the summoning device is a wearable device.

11. The autonomous mobile product-dispensing system of claim 10, wherein the mobile product dispenser and the summoning device is configured to communicate with each other over a wireless network.

12. The autonomous mobile product-dispensing system of claim 8, wherein the mobile product dispenser provides a recommendation for a product based on the health related information received from the summoning device.

13. The autonomous mobile product-dispensing system of claim 8, wherein the mobile product dispenser is configured to notify the administrator device when the first product ingredient or the second product ingredient is below a predetermined threshold.

14. A product-dispensing system, comprising:
a mobile product dispenser, comprising:
a plurality of chambers, wherein each of the plurality of chambers is configured to store a beverage-ingredient;
a dispenser control unit that includes a memory and is configured to receive user information including information associated with an identity of a user and a location from a mobile electronic device and to store the user information on the memory, wherein the dispenser control unit is configured to cause the mobile product dispenser to automatically move to the location;
a scanner configured to authenticate the identity of the user at the location;
a docking port; and
a product dispenser in communication with each of the plurality of chambers and configured to dispense one or more of the beverage-ingredients from the plurality of chambers; and
a docking station configured to connect to the docking port and refill one or more of the plurality of chambers with a beverage ingredient, wherein the docking station comprises a station control unit that comprises a transceiver, wherein the transceiver is configured to send information to and receive information from the mobile product dispenser.

15. The product-dispensing system of claim 14, wherein the identity of a user is identified using a biometric characteristic.

16. The product-dispensing system of claim 14, wherein the amount charged to a user is proportional to the volume of product dispensed.

17. The product-dispensing system of claim 14, wherein the amount charged to a user is dependent upon the type of product dispensed.

18. The product-dispensing system of claim 14, wherein the scanner is configured to read a machine readable item displayed on the mobile electronic device.

* * * * *